Sept. 29, 1970  J. E. JAMESON  3,531,346
METHOD OF FABRICATING A CAST SPACER-BLOCK
Filed May 15, 1967

INVENTOR.
JOHN E. JAMESON
BY Lyon & Lyon
ATTORNEYS

United States Patent Office

3,531,346
Patented Sept. 29, 1970

3,531,346
METHOD OF FABRICATING A CAST SPACER-BLOCK
John E. Jameson, Buena Park, Calif., assignor to Swedlow, Inc., Garden Grove, Calif., a corporation of California
Filed May 15, 1967, Ser. No. 638,336
Int. Cl. B32b 17/00
U.S. Cl. 156—107                                               7 Claims

ABSTRACT OF THE DISCLOSURE

Method of joining a plurality of transparent sheets around the viewing area with a cast-in-place spacer block which comprises placing a flexible compressible seal between the layers to be joined to maintain a sealed space therebetween, the pattern of the seal corresponding to the periphery of the viewing area desired, establishing the desired spacing between said sheets by the compression of the seal, placing a curable liquid resin composition in the area between the seal and the edges of the sheets, and permitting the resin to cure in place to provide a strong adherent bond of the resin to the sheets.

BACKGROUND OF THE INVENTION

The field of the present invention pertains to insulating glass and its method of manufacture.

Multi-layer insulating glass is widely used for windows, canopies and the like in aircraft. In order to maintain separation between the glass layers it is necessary to provide some type of spacer therebetween, and generally surrounding the viewing area. Various spacer techniques have been proposed in the fabricating of insulating glass. For example, previously the spacer has been applied by bonding an impregnated synthetic fabric to the glass plies. It has also been proposed to bond a strip of transparent rigid material to the transparent glass plies. These techniques are characterized by several disadvantages. The use of cement is required to hold the spacer in place. The cements tend to smear and produce optical imperfections around the edge of the spacer. More importantly, the spacers previously used are such that they must be carefully tailored in order to provide the desired spacing between the glass plies. There is no room for adjustment of this spacing during the fabricating operation. This requires the maintenance of close dimensional tolerances in the manufacture of the spacer.

In contrast to the foregoing, the present invention is primarily concerned with the novel method of fabricating insulating glass in which these disadvantages are overcome.

More particularly, the present invention is concerned with the provision of a spacer between the plies of an insulating glass which is cast in place. During the casting of the spacer, a compressible seal is used so that any desired spacing between the glass plies may be selected, thereby eliminating the need for the costly time-consuming hand-tailoring of the essentially inflexible prefabricated spacers.

SUMMARY OF THE INVENTION

The method of joining two or more transparent glass-like plies around the viewing area to form insulating glass which comprises placing a flexible compressible seal between said plies to be joined to maintain a sealed space therebetween, the pattern of said seal corresponding to the periphery of the viewing area, establishing the desired spacing between said plies by compressing said seal, placing a curable liquid resin composition in the area between said seal and the edges of said plies while maintaining said spacing, and permitting the resin to cure in place to provide a strong adherent bond of the resin to said plies.

The invention also includes novel insulating glass in which the plies are joined by a cast-in-place spacer block.

It is the principal object of the present invention to provide a novel method for the fabrication of insulating glass.

More particularly, it is an object of the present invention to provide a method of fabricating insulating glass in which the spacing between the individual glass-like plies can be adjusted as desired during the assembly operation to thereby eliminate the need for the tailor-making of the spacer to the desired spacing between plies.

Still another object of the present invention is the provision of the method of fabricating insulating glass which is simpler and more economical to practice.

It is a further object of the present invention to provide a novel insulating glass construction.

It is also an object of the present invention to provide a method of fabricating insulating glass in which the possibility of cement smears being formed in the viewing area is minimized.

These and other objects and advantages of the present invention will become apparent from a more detailed description taken in conjunction with the accompanying drawing.

DESCRIPTION OF PREFERRED EMBODIMENTS

Turning to the drawing, FIG. 1 shows the initial stages of the method of the present invention in which the seal has been placed upon the one glass-like ply.

Figure 1:
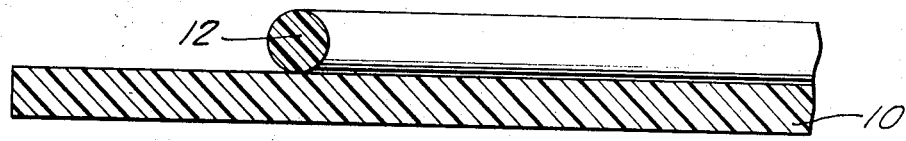
Figure 2:
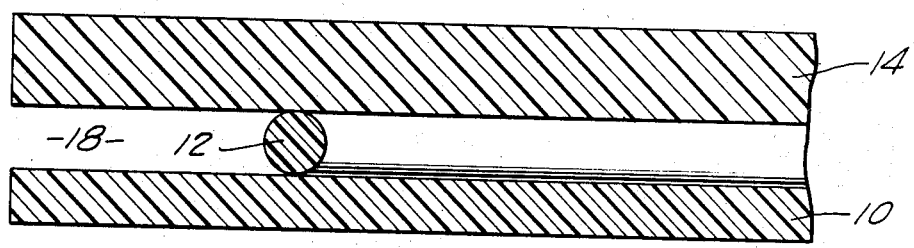
FIG. 2 shows the next stage in which the second glass ply has been placed on top of the seal.
Figure 3:
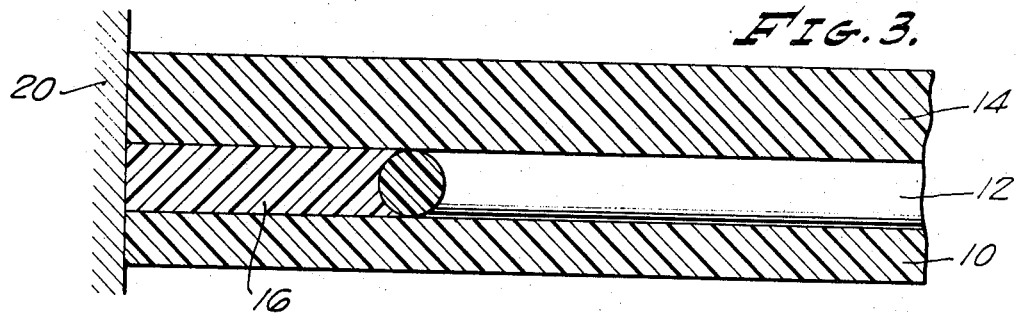
FIG. 3 shows the introduction of the liquid curable resin between the glass plies in the area between the seal and the edge of the plies.
Figure 4:
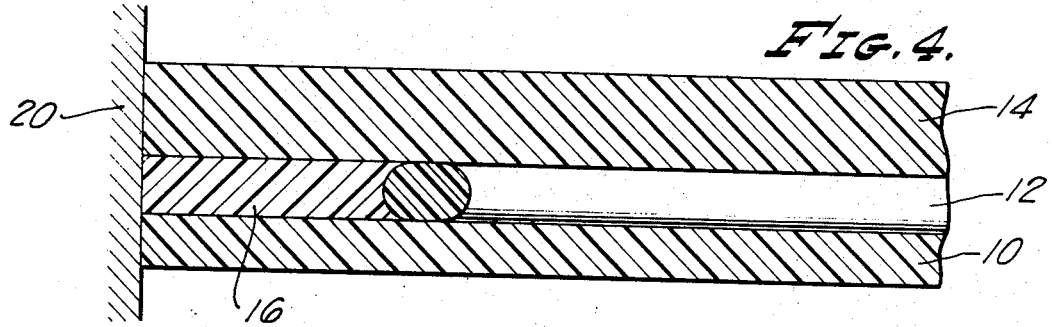
FIG. 4 shows the configuration of FIG. 3 in which the plies have been forced toward each other to achieve the desired spacing between the plies.

Discussing the drawing in greater detail, in FIG. 1 there is shown glass ply 10, on top of which has been arranged the seal material 12. The seal material 12 is arranged so that its shape conforms approximately to the periphery of the viewing area of the window to be fabricated. Thereafter, the second glass-like ply 14 is placed on top of the seal 12. Then the liquid curable resin material 16 is introduced into the area 18. It will be understood that the area 18 and those portions of the plies 10 and 14 lying immediately above and below it are not part of the viewing area, but will eventually be received in the frame of the window. The resin 16 may be held in place during curing by the temporary edge seal 20. As shown in FIG. 4, the spacing between layers 10 and 14 may be adjusted at any time prior to the curing of the resin 16 simply by squeezing together plies 10 and 14. This can be done manually or by the use of clamps. The seal material 12 is deformable over wide limits, while at the same time maintaining the desired seal against the glass-like plies so that the resin 16 cannot leak into the viewing area. After the resin 16 is set, the temporary seal 20 may be removed. In those cases where the liquid curable resin is sufficiently viscous prior to curing to resist flowing, the seal 20 need not be used at all.

The sealing material 12 as shown in the drawings comprises a length of flexible closed cell foam rubber tubing. However, it will be understood that the sealing material may be any other material which may be readily formed to the shape of the periphery of the viewing area, is capable of forming a seal between a glass-like material and itself so as to prevent leakage of a liquid curable resin therebetween, and is readily capable of being flattened or deformed by squeezing action. Many forms of rubber and plastic flexible hollow tubing are also useful as the seal material.

As used herein, the term "glass-like" is intended to include not only ordinary glass but any of the various specialty glasses, i.e., tinted glass, coated glass, as well as any essentially rigid transparent plastic materials such as Plexiglass (polymethylmethacrylate), and other similar materials. The glass-like materials are a well known class familiar to those skilled in the art and hence need not exhaustively be enumerated here.

The "liquid curable resin material" comprises any of the resin materials capable of being poured into a confined space and thereupon curing either at room temperature or at elevated temperature to form an adherent bond between the glass plies. Typical of such systems are the epoxies which comprise a polyglycidyl ether of dihydric phenols such as 2,2-(4-hydroxyphenyl) propane. The liquid curable epoxies normally contain a curing agent such as one of the aromatic polyamines. Various curable unsaturated polyesters may also be used, as well as various other liquid curable polymer systems which are already well known in the polymer art.

The following example is presented solely to illustrate the invention and should not be regarded as limiting in any way. In the example, the parts and percentages are by weight unless otherwise indicated.

EXAMPLE

Two glass plies of identical shape are trimmed and cleaned. The two surfaces of the glass plies which will be in contact with the cast-spacer block material are sanded using 60-grit sandpaper. A layout template is applied to one side of one of the glass plies to act as a guide in locating the compressible seal. As the compressible seal, a flexible compressible closed-cell rubber sponge strip, which in its relaxed state has a generally circular configuration, is coated on one side with a commercially available adhesive. The compressible seal is applied to the window ply, making sure that the adhesive-backed surface of the seal is in intimate contact with the glass. Then the second glass ply is laid on top of the seal and the two glass plies are compressed together, deforming the seal, until the desired overall thickness of the assembly is obtained. The compressing is carried out using C-clamps around the edges. The cavity between the seal and the edge of the glass plies is then filled with a liquid curable resin material comprising an asbestos filled Epon 828 epoxy resin (a diglycidyl ether of 2,2-(4-hydroxyphenyl) propane) and diethylene triamine, a room temperature epoxy resin catalyst. The liquid curable epoxy resin is injected into the cavity with an air-operated caulking gun. After the cavity has been filled with resin, any excess around the edges is wiped off and the resin is allowed to cure. After several hours, the assembly is complete and ready for any subsequent operation such as trimming, routing, drilling, etc.

As will be evident to those skilled in the art from the foregoing description, the present invention provides several significant advantages over the existing procedures for making insulating glass. The use of the seal provides complete flexibility and control in the spacing of the plies. The need for careful maintenance of dimensions in the prefabrication of a spacer block is totally obviated. The seal also prevents smearing or leaking of resin into the viewing area. Thus, the present invention will find wide application in the joining of glass-like plies intended for use in aircraft, space vehicles and in any other application where the known glasses have been used.

Having fully described the invention, it is intended that it be limited only by the lawful scope of the appended claims.

I claim:

1. The method of joining two or more transparent glass-like plies around the viewing area which comprises placing a flexible compressible seal between said plies to be joined to maintain a sealed space therebetween, the pattern of said seal corresponding to the periphery of the viewing area, establishing the desired spacing between said plies by compressing the seal, placing a curable liquid resin composition in the area between said seal and the edges of said plies, and permitting the resin to cure in place to provide a strong adherent bond of the resin to said plies.

2. The method of claim 1 wherein the transparent glass-like plies are glass.

3. The method of claim 1 wherein the transparent glass-like plies are polymethylmethacrylate.

4. The method of claim 1 wherein the seal comprises a compressible closed cell foam rubber strip having a normal cross-section which is circular.

5. The method of claim 1 wherein the curing of the liquid resin composition is carried out at room temperature.

6. The method of claim 1 wherein the liquid curable resin comprises an epoxy resin.

7. The method of claim 1 wherein the areas between said seal and the edges of said plies are sanded prior to the placing of the curable liquid resin composition.

References Cited

UNITED STATES PATENTS

| | | | |
|---|---|---|---|
| 2,077,305 | 4/1937 | Batchell | 161—45 |
| 2,750,637 | 6/1956 | Browne | 161—45 |
| 2,966,435 | 12/1960 | Kassinger | 161—45 |

DOUGLAS J. DRUMMOND, Primary Examiner

U.S. Cl. X.R.

161—45